United States Patent [19]

Hansen

[11] Patent Number: 5,406,474
[45] Date of Patent: Apr. 11, 1995

[54] SELF-TUNING CONTROLLER

[75] Inventor: Peter D. Hansen, Wellesley Hills, Mass.

[73] Assignee: The Foxboro Company, Foxboro, Mass.

[21] Appl. No.: 96,599

[22] Filed: Jul. 22, 1993

Related U.S. Application Data

[63] Continuation-in-part of Ser. No. 553,915, Jul. 16, 1990.

[51] Int. Cl.$^6$ ............................................. G05B 13/02
[52] U.S. Cl. .................................. 364/148; 364/158; 364/162
[58] Field of Search ..................... 364/148, 149–152, 364/158, 159, 160–163

[56] References Cited

U.S. PATENT DOCUMENTS

| Re. 33,267 | 7/1990 | Kraus | 364/158 |
|---|---|---|---|
| 3,798,426 | 3/1974 | Bristol, II. | |
| 4,602,326 | 7/1986 | Kraus . | |
| 4,855,897 | 8/1989 | Shinskey . | |
| 4,864,490 | 9/1989 | Nomoto et al. . | |
| 4,903,192 | 2/1990 | Saito et al. | 364/157 |
| 5,029,066 | 7/1991 | Hiroi . | |
| 5,043,862 | 8/1991 | Takahashi et al. | 364/162 |
| 5,153,807 | 10/1992 | Saito et al. | 364/157 |
| 5,166,873 | 11/1992 | Takatsu et al. . | |

OTHER PUBLICATIONS

Radke, F., Microprocessor-based Adaptive PID-Controllers, *ISA Transactions* 27:2 (1988), 43-50.

DaSilva, M., et al., A Rule Based Procedure for Selftuning PID Controllers, *Proc. 27th IEEE Conf. on Decision and Control*, vol. 313 (Dec. 1988), pp. 1947-1951.

*Primary Examiner*—Roy N. Envall, Jr.
*Assistant Examiner*—Thomas E. Brown
*Attorney, Agent, or Firm*—Lahive & Cockfield

[57] ABSTRACT

Apparatus and method for adapting the control parameters of a self-tuning controller. The apparatus detects a closed-loop response to a naturally occurring, unmeasured disturbance and determines two characteristics, the attenuation and the period of the response. The attenuation and the period provide sufficient information to partially identify the characteristic equation of the closed-loop system. The apparatus constructs from the partially identified characteristic equation a process model that represents the general behavior of the process. The apparatus generates new control parameters more appropriate for the identified process model, and appropriately updates the controller.

22 Claims, 7 Drawing Sheets

SELF-TUNING CONTROLLER

FIELD OF THE INVENTION

This invention relates to self-tuning adaptive controllers for controlling a process and more particularly to pattern recognition, self-tuning controllers and model identification self-tuning controllers. This application is a continuation-in-part of pending U.S. application Ser. No. 07/553,915 filed, Jul. 16, 1990.

BACKGROUND OF THE INVENTION

The pattern recognition approach to self-tuning is unique. One particular pattern recognition approach is the performance feedback technique. The performance feedback technique uses direct-performance feedback of a monitored process variable to determine the required action for optimizing the process. More specifically, a pattern-recognition, self-tuning controller continuously monitors and automatically evaluates a closed-loop response pattern of a measured process variable to naturally occurring, unmeasured upsets caused by a change in set point or load. After each upset, closed-loop error response characteristics such as overshoot and decay are identified and compared with desired characteristics. Differences between the desired characteristics and the measured characteristics are then used to automatically generate new tuning values for adjusting the controller according to the requirements of the process in order to achieve an error response target shape.

Adaptive process control systems that automatically identify and evaluate process response characteristics of the closed-loop response system are known in the art. The first successful adaptive control system was invented by Edgar H. Bristol, II and is disclosed in U.S. Pat. No. 3,798,426. According to Bristol's method, the adaptive system identifies both dead times and rise times of the closed loop response. These times are considered to have a significant relation to process characteristics. The Bristol control system scaled the rise time according to preselected scaling constants to establish evaluation intervals. During the evaluation intervals the actual error response is compared to a target error response. The results of this comparison are used to adapt the controller parameters.

The Bristol adaptive system provides effective adaptive control, but requires that the user preselect critical operating parameters such as the scaling constants. The scaling constants are used to normalize the measured pattern features. The normalization is necessary because the adaptive controller adapts control parameters according to the shape of the response as described by the observed pattern features. This makes the adaptor very sensitive to the shape of the error response.

An improved pattern-recognition controller was developed by Thomas W. Kraus, U.S. Pat. No. 4,602,326. The Kraus system monitors peaks of the error response signal. The measured peaks are used to define pattern features of the error response signal that are relevant to both the system response and the characteristics of the process. The controller compares the measured pattern features against a set of target pattern features, and adapts the controller parameters to optimize the control action.

The Kraus' system also has critical parameters that must be specified by an operator. For example, choosing the pre-specified wait period for the peak search. The Kraus system also has a tendency to tighten the tuning of the process until the response becomes excessively oscillatory. This tendency resulted in the controller overcorrecting the process to obtain an overdamped response.

In the above-cited U.S. application Ser. No. 07/553,915, filed Jul. 16, 1990, and herein incorporated by reference, a performance feedback controller is disclosed that responds to natural disturbances. The controller determines selected pattern features of the closed-loop error response that are caused by the detected disturbance. The pattern features are determined from measured peaks of the error response signal. The controller uses these pattern features along with a process type variable and a set of data tables to calculate changes in the control parameters that will achieve rapid convergence to a set of target response signal pattern features.

In the above application, rapid convergence to a target response signal feature is achieved by using an interpolative method for relating the determined pattern features to a set of three desired controller parameters. Therefore, this interpolation method tunes the controller parameters according to performance feedback from a particular detected disturbance. As a result, this method tunes the controller parameters to cause rapid convergence for disturbances similar to the previously detected disturbance. The disclosed controller is, therefore, very sensitive to the types of disturbances applied to the control system. Furthermore, the disclosed controller worked best if the identified pattern features characterize a certain category of response signals, and that these features characterize these signals with sufficiently complete information that the interpolation method can be validly applied. For certain categories of signals, such as nearly pure decaying or expanding sinusoids, the information contained in the pattern features is incomplete. In these cases, the interpolation system cannot be used to determine the necessary parameters of the controller and the controller defaults to a set of expert system rules. These expert system rules do not provide the rapid convergence of the interpolation system, and in fact, often converge very slowly or worse, detune the control system.

A similar difficulty with the interpolation method is that it works best with isolated signals. The controller defines a response signal as isolated if the response signal is detected after an interval of relatively quiet operation. The response signal is isolated for example, if the signal is detected after at least one predefined time interval, defined as a search interval, and the search interval elapsed without any detected signal activity. The signal is non-isolated, for example, when the error signal is a sinusoid superimposed on a ramping linear signal. For non-isolated signals, the controller again defaults to a set of expert system rules that often cause slow system convergence.

To compensate for the interpolation method's difficulty with non-isolated signals, a method for selecting a specific series of peak values is implemented by the controller. This method, described as peak slipping, compares the relative amplitudes of successively measured peaks for the purpose of identifying three successive peaks that provide the sufficient information for the interpolation method used in concert with a system of expert rules. This peak slipping process adds an extra step in the adaption process that requires multiple sets of pattern features to be determined and compared.

SUMMARY OF THE INVENTION

It is an object of the present invention to provide an adaptive controller that has an adaptor that observes a closed-loop signal that is responding to a natural or applied disturbance and that identifies pattern features of this signal that partially identify the general characteristic behavior of the closed-loop control system, in order to adapt the control parameters according to the general system behavior instead of adapting the control parameters to the specific system behavior that relates to one type of disturbance.

It is a further object of the present invention to provide an adaptive controller that is less reliant on expert system rules to tune the parameters of the controller.

It is further object of the present invention to provide a control apparatus that has a selection means that monitors the response of a control system to a disturbance for selecting a disturbance response that characterizes the general behavior of the closed-loop system, but is a response that contains insufficient information to interpolate three controller parameters.

It is a further object of the present invention to provide an adaptive controller that can identify two parameters of a process model, wherein the process model is representative of the process within a closed-loop system.

It is a further object of the present invention to provide an adaptive controller that can adapt control parameters according to an identified process model, to adapt the control parameters according to the general behavior of the identified model.

It is a further object of the invention to provide an adaptive controller that can identify a two parameter process model from a reduced number of observations of a closed-loop response signal.

It is a further object of the present invention to provide an adaptor that can identify two process parameters from a response signal, by identifying the relevant information within the response signal in order to tune the controller from a larger category of available response signals.

It is a further object of the present invention to provide an adaptor that characterizes the transfer function of a closed-loop control system according to pattern features, wherein the pattern features are representative of the time scale of the process behavior and the gain scale of the process behavior.

It is a further object of the present invention to provide an adaptor that selects a 2-parameter process model representative of a process within a control system according to user-selected design criterion.

It is a further object of the present invention to provide an adaptive controller that monitors a single response signal and adjusts the control parameters based on the observations of this single monitored signal.

It is a further object of the present invention to select from stored sets of tuning constants the most appropriate set of tuning parameters as determined by initial response conditions.

It is a further object of the present invention to provide an adaptor that stores adapted controller parameters upon detecting a new closed-loop response, in order to provide sets of stored controller parameters adapted to provide improved tuning in anticipation of non-linear system behavior.

In general, the invention features a self-tuning controller that monitors a closed-loop system signal, that responds to system disturbances, particularly naturally occurring disturbances. The invention monitors that responding signal and measures the attenuation and the period of the response. The attenuation and the period characterize a complex root of the closed-loop characteristic equation. The invention determines from this root, and the current controller structure and parameters, the gain and the phase contributions of the process to the closed-loop system. In one aspect of the invention, a 2-parameter process model is assumed, such as a gain-two-lag delay model, and the values for two of the parameters, for example the gain, and delay time, are determined from the gain and the phase at the observed closed-loop root. A realization of the present invention is that it allows the controller parameters to be selected as they relate to a model of the partially identified process. To that end, the present invention provides for the tuning of control parameters based on the general behavior or autonomous behavior of the closed-loop system as this behavior is represented by the characteristic equation of the closed-loop system. Further, it allows the control parameters to be determined from a reduced set of response signal pattern features, thereby reducing the reliance on expert system rules.

BRIEF DESCRIPTION OF THE DRAWINGS

The foregoing and other objects, features, and advantages of the invention will be apparent from the following more particular description of the preferred embodiment of the invention, as illustrated in the accompanying drawings in which like reference characters refer to the same parts throughout the different views.

DETAILED DESCRIPTION

Figure 1:
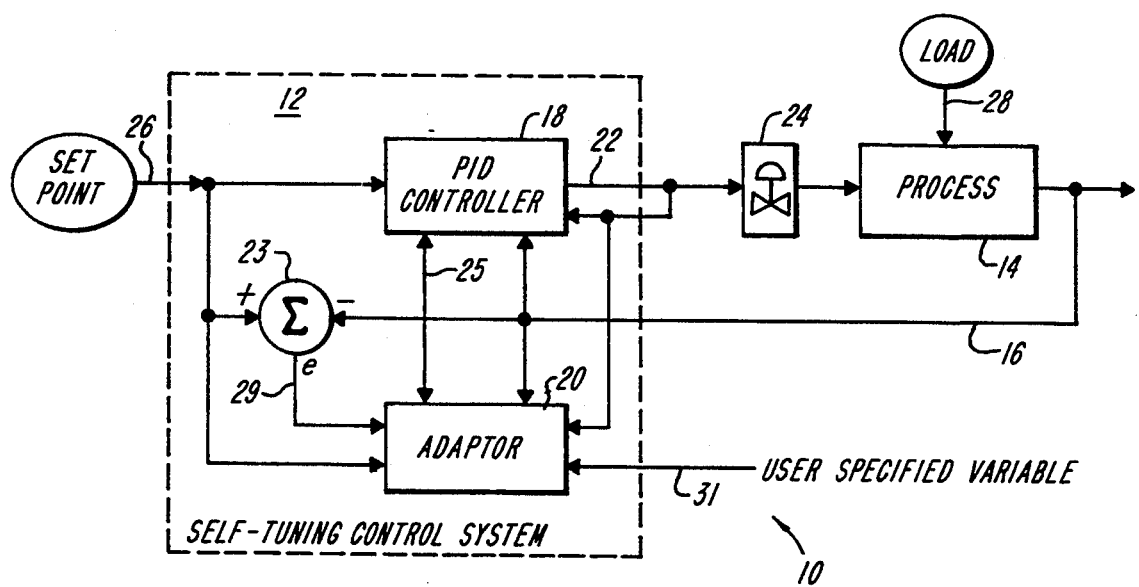
FIG. 1 is a block diagram of an adaptive process control system according to the present invention.

The present invention uses performance feedback and partial process identification to update the parameters of a PID controller following each significant control error response to naturally occurring disturbances.

For performance feedback control, performance is measured using the pattern shape features of the error response, overshoot and decay ratio, which are independent of the amplitude and time scales. The pattern features of an isolated error response provide complete information for updating the control parameters when the response is oscillatory and decay is not equal to overshoot. Targets for the error response features are chosen so that the time scale of the response is optimized when the targets are realized by proper adjustment of the controller parameters such as proportional band, integral time and derivative time. It should be noted that the derivative time to integral time ratio may be programmed using the knowledge of type of process to be regulated. The process type can be determined through interpolation or extrapolation of measured integral-time-to-period ratio data with similar data stored for known extreme process types such as pure delay and integral delay. Alternatively, the process type can be declared by the user or operator. Knowledge of the process type is not only used for programmed adaptation of the derivative time but is also used to improve the convergence rate of the proportional band and integral time through interpolation or extrapolation of data relating performance measures to tuning constants for specific process types. For an oscillatory response, overshoot is calculated from the ratio of two successive peak heights. The decay ratio is the half period peak-to-peak ratio involving three successive peak heights. The derivative time may also be determined by performance feedback using a full period decay ratio involving a peak-to-peak ratio of four successive peaks. However, because this performance measure is very sensitive to noise, programmed adaptation for derivative time based on a measure of process type is preferred.

Furthermore, the present invention makes use of the recognition of a beginning of a response to choose the most appropriate set from stored sets of previously adapted PID tunings. At the end of the response, this set of stored sets of PID tunings is updated. The PID tunings are correlated with error response direction and/or with subranges of a user-specified variable.

For the partial process identification control, pattern features of a non-isolated error response or of an oscillatory error response that does not provide complete information for updating the control parameters, are determined. In the preferred embodiment, these pattern features represent the attenuation and the period of the oscillatory response. These pattern features characterize a complex root of the closed-loop control system. This complex root partially identifies the autonomous behavior, or the characteristic equation, of the closed-loop system. The controller uses this complex root and the current structure and parameters of the controller, to develop a partial model of the process. In a subsequent step, the adaptor calculates a set of two process characteristics the time scale and the gain scale. Using predetermined conversion factors, the adaptor generates a new set of controller parameters, by multiplying the gain scale parameters by these predetermined conversion factors. These conversion factors are predetermined by a pre-tune process, calculated off-line or using the algebraic tuning rules described in more detail in the commonly assigned U.S. application Ser. No. 08/096,600, now U.S. Pat. No. 5,394,322 entitled Self-Tuning Controller That Extracts Process Model Characteristics, (filed concurrently herewith and identified as Attorney File FOM-014CPB).

Knowledge of the process type is also used to develop a more detailed process model. In one embodiment of the present invention, a three parameter or four parameter process model is identified by using knowledge of the process type to identify a third or fourth process parameter that relates to the two parameters determined from the two pattern features of the response signal.

Referring now to FIG. 1, an adaptive process control system 10 includes a self-tuning control system 12 and a process 14 which is characterized by a controlled process variable 16, such as temperature, pressure, level, or concentration. Self-tuning control system 12 preferably consists of a PID controller 18 and an adaptor 20 for automatically adjusting or tuning the control parameters of the controller to optimize the closed-loop performance. Generally, tuning parameters 25 (discussed in greater detail below) are calculated using the values of process controlled variable 16 and a set point 26, the difference between these values (defined as an error signal 29 and produced by a summing amplifier 23), the controller output 22, and a user-specified variable 31. The control parameters are tuning "constants," which may include proportional band (P), integral time (I), derivative time (D) and the lead/lag ratio of a set-point compensator. Using some or all of these control parameters, controller 18 produces a control signal 22, which is received by a control element 24, such as a valve, for regulating process 14.

Process 14 responds to changes in control element 24 such that the value of controlled variable 16 becomes substantially equal to the desired value represented by set point 26 in the absence of load disturbances 28. Thus, the desired result is that process control system 10 be responsive to control error caused by changes in set point 26 or loads 28 on process 14. For example, if the magnitude of the load change is sufficiently large to cause the process 14 to make appreciable changes in the value of the process controlled variable 16, the controller 18, providing its parameters have been well tuned, will respond accordingly with corrective output 22 action to remove the effects of the disturbance. If the error response shape indicates sub-optimal disturbance rejection, the adaptor 20 updates the controller parameters to condition the controller for the next disturbance.

Figure 2:
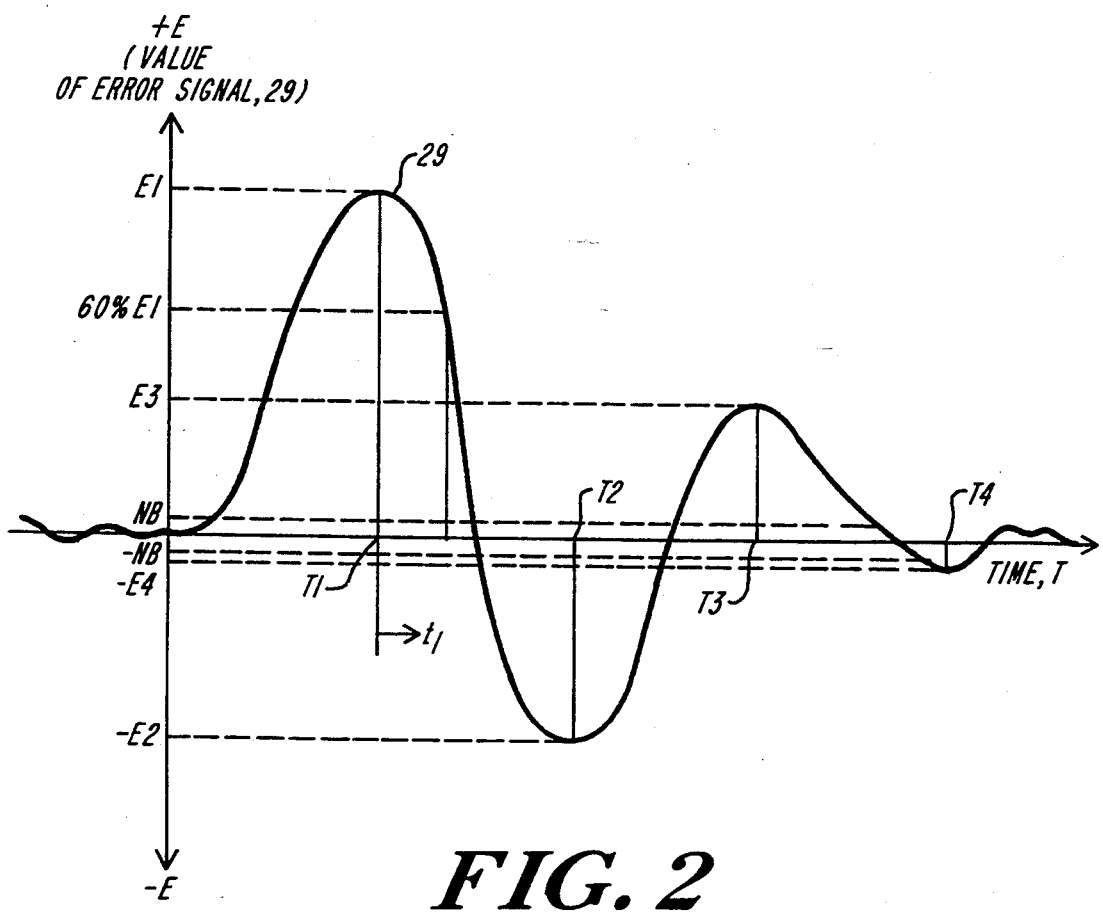
FIG. 2 is an error signal representing a closed-loop response of the adaptive process control system of FIG. 1.

A general description of the performance feedback adaptive process control of system 10 according to the present invention can be best presented in terms of the behavior of error signal 29 as a function of time shown in FIG. 2. This error signal represents the closed-loop response of adaptive process control system 10 to an upset condition which causes a difference between set point 26 and the value of process controlled variable 16. The upset condition depicted is caused by a load disturbance 28 (such as a change in production rate) which significantly disturbs the value of the process controlled variable 16. However, as noted above, the upset could be caused by a sudden change in set point 26. The vertical axis of the plot indicates the measured value (E) of the error signal. The horizontal axis is time (T) with an arbitrary base value. In isolated oscillatory cases, the error signal 29 is characterized by as many as four peaks (also known as local extrema) having peak values E1, E2, E3, and E4 which occur at times T1, T2, T3, and T4, respectively. Eventually, the integral action of controller 18 positions the valve 24 so that the measured value of the error signal becomes substantially equal to zero, which corresponds to the condition where the process controlled variable 16 has returned or changed to its desired value. A noise band (NB) whose value is the expected peak-to-peak variation of the error signal (PPNB) during quiet intervals between isolated upsets and is shown centered on the horizontal time axis. During operations of system 10, the noise band value is adapted as will be discussed below. In a further embodiment, a user set threshold is used. The threshold is set so that the controller 18 responds to only significant response disturbances.

Figure 3:
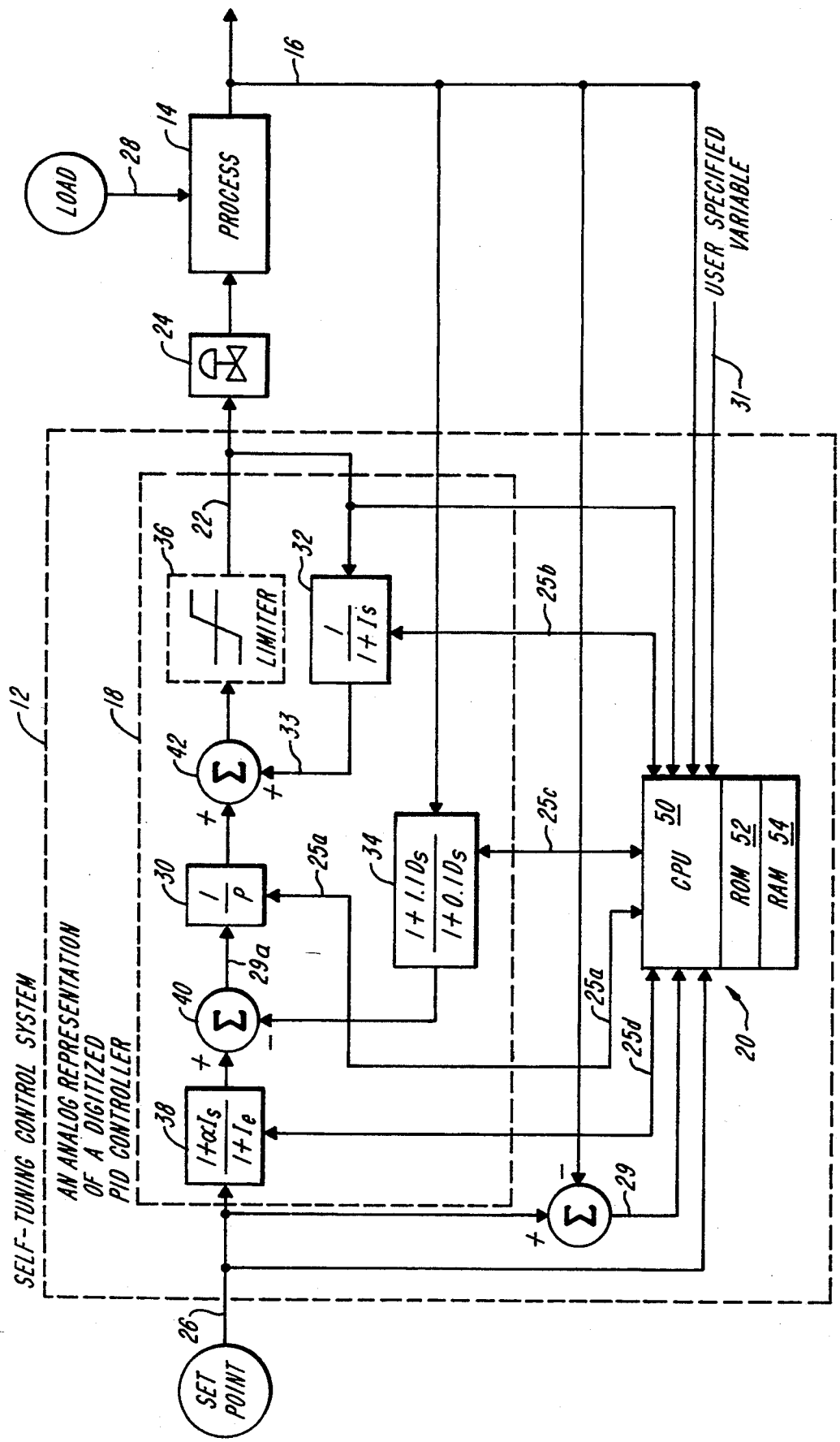
FIG. 3 is a detailed block diagram of the adaptive process control system of FIG. 1.

Using measured amplitudes of the error signal and times of their occurrence, the closed-loop response of adaptive process control system 10 can be characterized in terms of decay, overshoot, and time period, which are performance measures that are well known to control engineers for describing the behavior of the control loop. These performance measures together with the control parameters, P, I, and D, may then be used to determine the process type, such as a delay process, integral delay (dominant lag) process, or something in between. New control parameters are calculated for driving the decay and overshoot values to target values for that process. Specific details for measuring these performance values and for calculating the proper control parameters will be discussed below. Referring now to FIG. 3, a more detailed block diagram of a preferred interacting digital type PID controller 18 is shown in terms of an equivalent analog controller element to aid in the explanation of the adaptive control. The PID controller 18 includes four filters: a proportional filter 30, an integral filter 32, a derivative filter 34, and a set-point filter 38. Proportional filter 30 is basically the inverse of the proportional band constant P and is used to determine the responsiveness of controller output 22 to filtered error 29a.

Integral filter 32 receives an integral feedback input signal which may be the control signal 22 and generates a lagged positive feedback signal 33. Integral filter 32 is a first-order lag filter whose time constant is the integral time constant I. Derivative filter 34 is used in the measurement feedback loop as shown and operates as a lead-lag filter. Derivative filter 34 may include a second order lag term to attenuate high frequency measurement noise and thereby prevent unnecessary valve activity. The proportional, integral, and derivative terms in these filters are the control parameters determined and controlled, via lines 25a-c, by adaptor 20 and are discussed in greater detail below. In the preferred embodiment, controller 18 further includes a limiter 36 which is set to prevent the output 22 from exceeding the range of the control element 24.

During operation of system 10, set point 26 is preferably supplied to controller 18 via filter 38. This filter 38 includes the integral time I, and a "constant" k as shown. As indicated by the phantom lines, filter 38 is not required in a regulator application; i.e., one with a constant set point. However, it is preferred in the present embodiment to prevent a set-point change from causing an excessive overshoot condition, particularly with a dominant lag process. Similar to the other tuning parameters in controller 18, these terms are initially determined by preset, pretuned, or default values and thereafter controlled by adaptor 20 via line 25d.

The output of filter 38 is thereafter combined, via a summing amplifier 40, with the output of derivative filter 34. The resulting signal 29a is then multiplied by the inverse of the proportional constant P of proportional filter 30 and summed, via a summing amplifier 42, with the output of integral filter 32. The sum is then limited if necessary by filter 36 to produce control signal 22 for regulating valve 24. The output of integration filter 32 is a positive feedback signal that provides integral action on the control error when controller output 22 is between the limits of the limiter 36, but prevents integral windup when controller output 22 is at one of the limits. Adaptor 20 monitors controller output 22 to detect output limiting. It should be clear to one skilled in the art that, instead of using the control signal 22 to directly control the valve, signal 22 could be used as a set point of a secondary controller (not shown). The controlled process variable of that secondary controller would then be fed to integral filter 32 as an external integral feedback signal. Similar to the adaptive process control system described above, the primary process measurement, or measured value, is made available to derivative filter 34 and to adaptor 20 as are the controller's output (or integral feedback) and set point. A detailed block diagram of adaptor 20 is also shown in FIG. 3 and includes a processor 50 which receives and processes the controller output 22 (or integral feedback), controlled variable 16, set point 26, error signal 29, and the user-selected variable 31, in accordance with software stored in Read Only Memory (ROM) 52 to produce tuning parameters (P,I,D, and k). These parameters are subsequently applied to controller 18 via lines 25a-d. A Random Access Memory (RAM) 54 is provided to contain the data memory and registers required by the microprocessor for implementing the software operations in the ROM.

When processor 50 is first initialized, preset control parameters (which may be stored in RAM 54 or in memory, not shown, of controller 18) are transferred to processor 50. These tuning parameters may have been achieved using a pretuning feature similar to that described in the Kraus patent referenced above or may have been selected by an operator. Other settings are also fed to processor 50 and include a minimum, WMIN and maximum, WMAX, wait times for establishing time windows for searching for peak values, an initial noise band NB term and target performance values which can similarly be selected by the operator. The minimum wait time WMIN is used in the confirmation of peaks, which will be discussed below. Typically this value is set to 2 or 3 times the sampling time of the adapter and prevents the system from picking out a peak caused by excessive derivative action. A more detailed discussion regarding these other settings is given below. Referring now to the flow diagrams in FIGS. 4-5, the operation of processor 50, after being initialized (Step 70), can generally be described in terms of primary operating states. The primary operating states include a quiet state 56, states in which the processor searches for four consecutive peaks, and a settling state 68.

QUIET STATE AND SETTLING STATE

During quiet state 56 or settling state 68, the processor is looking for a new or continuing transient. If, during the settling state, the error signal remains within the noise band for an adequate time (a half or full period), the settling state 68 is terminated and the processor enters the quiet state 56, Steps 74 and 76.

The distinction between these states is that if the error signal 29 exceeds the noise band plus one percent of the full scale measurement while the processor was in the settling state, then the error signal is declared a continuing oscillation (or an overlapping response). An isolated disturbance is recognized if the response starts from the quiet state. Thereafter, processor 50 begins a search for pattern characteristics of the error signal 29, Step 78. Referring to FIG. 2, the quiet and settling states are associated with the condition where the measured value of the error signal is between the upper and lower levels of the noise band. So long as the value of the error signal 29 remains between these levels, no new disturbance is recognized and no changes in the control parameters are made. If quiet state lasts at least one period following an adequately damped response, Step 82, the noise band is measured and updated, Steps 84, 86, and 88. In previous self-adapting systems, the noise band was a fixed value selected by a user or measured during a pretuning phase as an open loop measurement. According to the present method, the noise band is measured under closed-loop conditions and is updated with changing process conditions. The user at any time can insert a value which will override and reinitialize this adapted value. Updating the noise band requires that the quiet period extend for at least one natural period of the closed-loop as determined during the last upset, Steps 76, 80, and 82. At startup, the period timer is set equal to the maximum wait time, $W_{MAX}$, selected by the user or a pretune specified wait time. The noise band is updated if one of the two following criteria is satisfied:

1. The new noise band value is less than the previous noise band value; or
2. a) The previously determined overshoot value is greater than or equal to zero; and
   b) the error is not a continuing oscillation (that is the last observed oscillation started from a quiet condition); and
   c) the previous measured decay ratio is less than or equal to the decay ratio target plus 0.1.

Note that satisfying the second criterion permits the noise band to be updated to larger or smaller values. The new peak-to-peak noise band is calculated as the root-mean-square (RMS) value of the measured noise (that occurred during the quiet period) times an arbitrary factor, which is preferably set to six standard deviations, Steps 84, 86, and 88. These criteria are imposed to assure that the loop was neither overdamped nor too underdamped when the noise band is allowed to increase.

SEARCH FOR FIRST PEAK

Once the error signal 29 crosses a threshold related to the noise band, Step 74, the processor enters the first of four states for locating peaks or amplitudes which will be used as if they were peaks of the error signal. In the preferred embodiment, this threshold is set equal to the noise band plus one percent of the measurement range. The first state 58 includes initializing a period timer (a counter incremented with each new error sample), determining the sign of the error signal, and searching for the first peak of the error signal, Step 90. For convenience, if the sign of the error signal is initially negative, it is sign corrected such that the initial deviation from the noise band of the sign corrected error is positive. Further, when the error signal is first detected, the uncorrected error sign and the user-selected variable 31 are used to indicate the likely process operating condition for the new response. Based on the value of initial error sign and/or the selected variable, stored tuning values which best exploit past experience in coping with this process operating condition are inserted into the controller, Step 78.

An appropriate user-selected variable can include the set point 26 or a measured load 28 which anticipates the new final operating condition. For example, the set point can be used as the user-selected variable as an indicator of the future settled value of the process controlled variable. This is done if the nonlinear process behavior is most dependent on the value of the controlled measurement, since the set point anticipates the controlled variable. For another process, a measured load variable (or the controller output) may be a better choice. By selecting the most appropriate among successful past tunings, the system is better able to cope with process nonlinearity. This is a form of adaptive gain scheduling determined by performance feedback rather than open loop programming based on an identified or specified process model.

In the preferred embodiment, previous sets of adaptive tuning parameters, P, I, D and lead-lag ratio are stored and indexed according to the error response direction and magnitude values of the user-selected variable. The range of the user-selected variable may be subdivided and indexed into several subranges. For the preferred embodiment, the range of the selected specified variable is divided into three subranges, such that for each subrange there are two sets of tuning PID parameters (the set to be used depends on the initial sign of the error signal and the subrange of the user-selected variable). These tuning values are selected and updated to exploit and improve upon past experiences in coping with new disturbances. Of course this concept could be extended to multiple subranges of several variables. Further, it should be noted that the user may elect to select no variable. Then the selected set of tunings would depend on initial error sign alone. For example, the user would not select a variable if the process is linear.

The first peak, E1, is located by comparing the current magnitude of the measured error signal to a previously measured value, hereinafter referred to as a tentative first peak. If the current magnitude of the measured error signal is greater than the tentative first peak, then the value of the tentative first peak is replaced with the magnitude of the currently measured error signal and the period timer is reset to zero. This new tentative value is then compared with successively measured magnitudes of the error signal. This recursive step continues until the maximum wait time, $W_{MAX}$, expires or when the tentative first peak is confirmed as a bona fide peak. If time since the tentative first peak exceeds $W_{MAX}$ before the first peak is confirmed, then the tentative first peak is declared confirmed and the last measured error value is declared to be an unconfirmed second peak, E2, Steps 92 and 94. This criterion is used to stop the peak search when the controller has very sluggish tuning. Processor 50 then uses this incomplete information to make the PID tuning less sluggish, Step 98, as will be discussed below.

Before the peak timer reaches $W_{MAX}$, an attempt is made to confirm that the tentative peak is the first peak, E1, and not a noise artifact, Step 96. Table 1, set forth below, lists the preferred criteria for confirming peaks. These criteria are selected to reject local noise peaks and short-period peaks caused by excessive (mistuned) derivative action. Note that $t_{MIN}$ is the minimum value that the period timer $t_1$ may achieve after the first peak before starting information gathering for a particular peak. This "wait" time may be used to avoid detecting some of the high frequency oscillation peaks that may be the result of derivative action misapplied to a pure delay process. As indicated, if the difference between the tentative first peak and the current error exceeds the noise band and the current error is less than 0.6 times the tentative first peak, the first peak is confirmed. A method similar to that described above for locating and confirming the first peak will be used in locating and confirming other peaks.

SEARCH FOR SECOND PEAK

Figure 5:
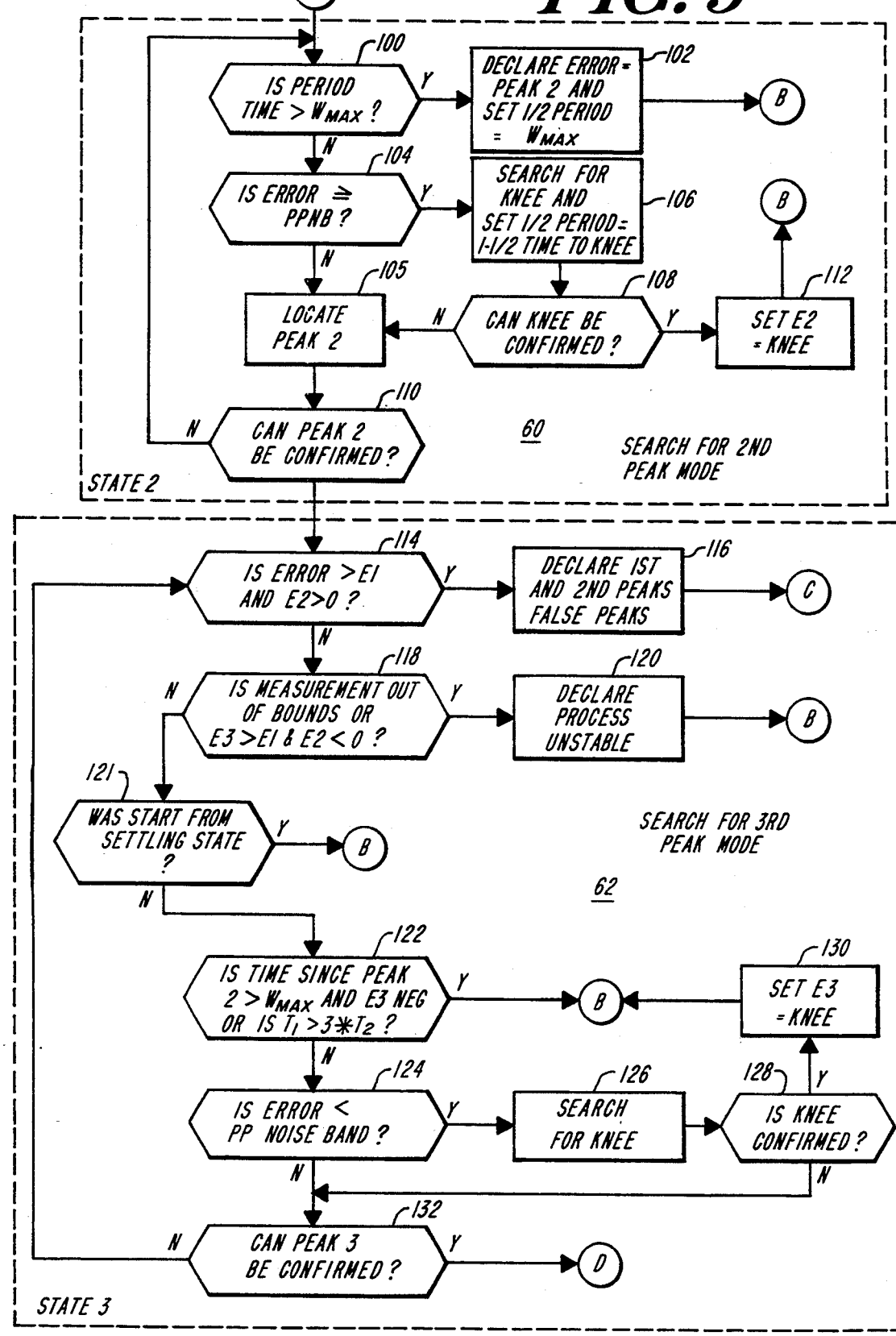

Assuming that the first peak has been located and confirmed, processor 50 enters state 2, generally indicated by Steps 100 to 112 (FIG. 5). Initially, the period timer, $t_1$ is set to zero at the first peak E1 and is used for measuring the time since the first peak. If this timer exceeds $W_{MAX}$ the tentative second peak value will be used as the second peak E2 and the controller tuning is tightened to speed up this sluggish behavior, Steps 100 and 102. In this state, processor 50 is searching for an amplitude which may be a second peak E2 or a knee in the error curve, which may be used as if it were an unconfirmed second peak. A knee is a pattern feature of an overdamped response that has only one peak (E1).

A tentative knee is located at a point on a tangent drawn through the error response 29 and a point having a 0.6 amplitude of the first peak E1 at $t_1=0$. A tentative half period is chosen as 1.5 times the time from the first peak to the tentative knee, Step 106. A time interval equal to two times this tentative half period is used to search for and confirm the second peak. This maximum search time is independent of a previous response measurement or a preset wait time as disclosed in Kraus. Thus, a finite search time interval for locating the second peak is established even when a second peak exists.

The tentative knee is abandoned if the error response 29 becomes less in magnitude than the negative noise band because a second peak can then be located. The tentative half period is then revised to be the time between the first peak and the tentative second peak. If, however, after two tentative half periods a second peak has not been confirmed, the search for peaks is terminated and the PID calculations are entered, Step 102. The knee is confirmed and used in the PID calculations as the unconfirmed second peak, if has not already been abandoned.

TABLE 1

TEST FOR PEAK CONFIRMATION

1. The currently measured error response is closer to zero than 0.6* peak being compared.
2. The currently measured error response is at least NB closer to zero than the peak being confirmed.
3. Sufficient time since the last peak has elapsed for the start of confirmation of the following peaks:
   a) $^tMIN = 0$, for the first peak, E1;
   b) $^6MIN = {}^WMIN'$ for the second peak, E2; and
   c) $^6MIN =$ twice the time interval between E1 and E2, for the third peak, E3.

SEARCH FOR THIRD PEAK AND FOURTH PEAK

When a second peak is confirmed, the search for a third amplitude, which again may be a peak or a knee, is begun (state 3). The same procedure used for locating the second peak, described above, is followed, except that the confirmed half period is not further revised. If, during the search, the third tentative peak exceeds the first peak and the second peak is also positive, the first two peaks are abandoned and the search for a first peak is again initiated, Steps 114 and 116. If the process controlled variable exceeds its range during the search for the third peak, the search is terminated and the violated range limit is used as the unconfirmed third peak estimate in the new PID calculations, Steps 118 and 120. Alternatively, if the tentative third peak is greater than the first, but the second peak is negative and the product of the first and third peaks is not less that the square of the second peak, the response is considered unstable, Step 120, and the search for peaks terminated and new PID calculations based on this information entered.

Two half periods after the second peak are allowed to confirm the third peak. If it is not confirmed in this time, the search is terminated and appropriate PID calculations are entered. Providing time since the second peak does not exceed two half periods and error signal 29 remains negative, processor 50 searches for a knee in the same manner described above, Steps 122, 124, and 126, using the magnitude of the second peak. If the knee value can then be confirmed, it will be used as the unconfirmed third peak, Steps 128 and 130.

Providing the third peak is confirmed, a fourth peak will be sought in the same manner described above for a half period after the third peak. There is no attempt to confirm the fourth peak.

CALCULATION OF NEW CONTROL PARAMETERS

Figure 4:
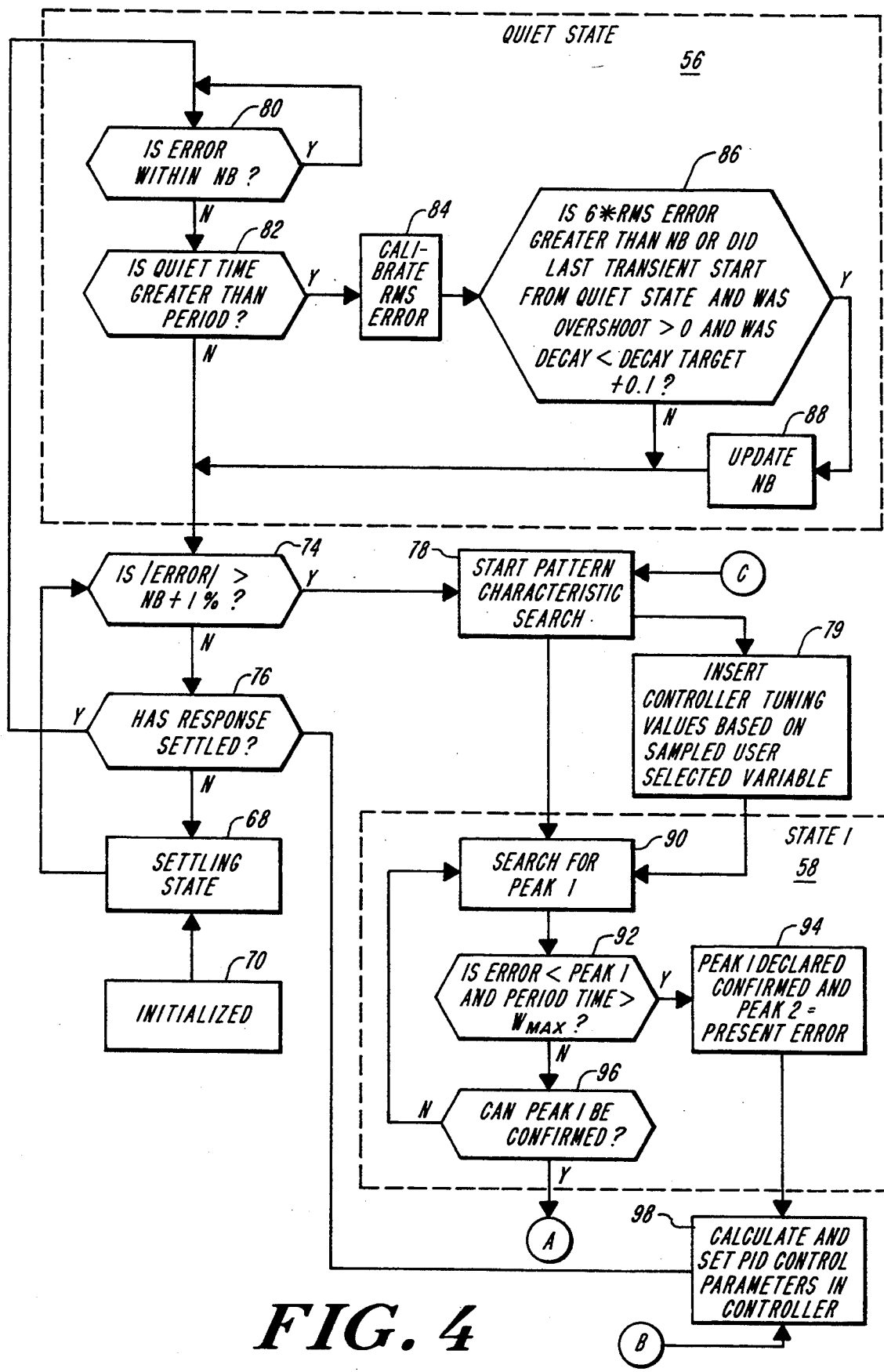
FIGS. 4–5 are flow diagrams indicating the operating states of the processor shown in FIG. 3.

Using the measured amplitudes, values for pattern features of the error signal can be determined and used to update the set of PID control 20 parameters for the just completed responses, Step 98 (FIG. 4). The half-period (T) and dimensionless pattern features which include overshoot (OVR) and decay are determined according to the equation set forth below.

$$OVR = -E_{(2+N)}/E_{(1+N)} \qquad (1)$$

$$DECAY = (E_{(3+N)} - E_{(2+N)})/E_{(1+N)} - E_{(2+N)} \qquad (2)$$

$$T = T_{(2+N)} - T_{(1+N)} \qquad (3)$$

The variable N depends on the number of peaks that were located and skipped before selecting three successive amplitudes to calculate the above pattern features. Skipping peaks will be discussed in greater detail below. If the fourth peak E4 is lost in the noise band or a fifth peak is needed, a peak can be estimated according to the formula set forth below.

$$E_{(3+N)} = \frac{E_{(1+N)} * E_{(2+N)}}{E_{(N)}} \qquad (4)$$

This equation is based on the assumption that the error signal is exhibiting a near optimal decay where the real parts of the three dominant closed-loop poles are identical.

The set of successive peaks that will be used for updating the control parameters is determined by comparing the values of decay and overshoot based on the first set of three peaks located by processor 50 (N=0), Step 140, FIG. 8. If decay is less than overshoot, then processor 50 will "peak slip;" i.e., calculate new values for decay and overshoot, based on the next set of three peaks (N=1), and determine if a second peak slip (N=2) is necessary. In other words, peak slipping implies that the second peak will be declared the first peak, the third peak will be declared the second peak, and so on, for the purposes of selecting successive peaks that will be used to calculate new decay and overshoot values for determining corrective control parameters. More simply, if:

$$E_{(1+N)} * E_{(3+N)} < (E_{(2+N)})^2 \qquad (5)$$

then there is a peak slip.

Once an N is found where the first product of equation 5 is larger than or equal to the second product, the first of the three successive peaks used may be tested to determine if it would trigger a peak search. It should be greater than one percent of the full-scale controlled variable plus the noise band in order to calculate the PID control parameters, Step 142. If this condition is not met, there is no PID update because the response is not large enough and the adaptor is switched to the settling state. However the set-point compensator factor k, may be adjusted, based on the overshoot prior to peak slipping, provided that the error response was initiated by a set-point disturbance. The set-point compensator factor k ranges from 0.2 for a dominant-lag process to 1.0 for a dominant delay process. The factor k is determined as a function of the process type. This factor is decreased by the amount of overshoot which exceeds the target overshoot prior to peak slipping. This factor is increased following a sluggish isolated set-point response (negative overshoot) by an amount equal to the overshoot deviation. The decay and overshoot targets are also appropriately adjusted (temporarily) after a peak slip, but before P, I, and D are updated, Steps 144, 146 and 148. The adjustment is made so that there will be no change in the PID tuning if the process is disturbed either by an impulse requiring peak slipping or a step requiring no slipping.

At this point, overshoot decay, and integral-to-half-period ratio of the error signal have been determined and can now be used to classify the PID adjustment process into categories based on the completeness of information that can be obtained from the error signal. A first category, generally indicated by Steps 150 and 152, deals with information in the following way. If the value of decay is greater than 1.2 or the second or third peak is beyond the measurement range, the control loop is recognized as grossly unstable, Step 150. For this case, the proportional term is doubled, the integral term is set equal to the half period, and the derivative term is set equal to zero, Step 152. The process type (ptype) is also set equal to 1.2. In an alternative embodiment, if the value of decay is greater than 1.2 or the second or third peak is beyond the measurement range, the control loop is recognized as unstable and control parameters are determined according to a model-based approach, explained in greater detail hereinafter.

A second category deals with information which indicates an overdamped response with only one confirmed peak and is generally indicated by Steps 154 to 159. If the half-period is greater than or equal to $W_{MAX}$, the proportional term is halved and the derivative factor is set to zero, Steps 155 and 156. Otherwise, the proportional term is updated according to the following recursive formula, Step 157.

$$P = P*(1 + 1.5(\text{DECAY} - \text{DECAY TARGET})) \quad (6)$$

Further, the integral time is multiplied by 0.8, if the overshoot is less than minus 0.075, Steps 158 and 159.

Note that for this case, the unconfirmed second peak E2 was either the knee or the lowest value found during the search for the second peak E2. Further, since the third peak E3 cannot have an amplitude more than the peak-to-peak noise band (PPNB) above the unconfirmed second peak E2, decay is calculated based on this extreme case (provided decay does not exceed its target). This will cause the proportional band to be larger than it would have been had the decay been assumed zero in equation 6. As a result, the control is not overly tightened when the response is so small that the second and third peaks cannot be distinguished from noise.

A third category is generally indicated in FIG. 8 by Steps 162 to 168. This case occurs when the decay minus overshoot is less than 0.02, which indicates that the closed-loop response is close to being that of a damped sinusoid, Step 162.

In this category, the peak values previously ascertained are re-examined to calculate one root of the closed-loop system characteristic equation. In general, the controller calculates from this root and the current controller structure and parameters, the gain Gc and the phase lag $\Phi_c$ contributions of the controller at that root. Furthermore, as will be explained in greater detail hereinafter, two parameters of a process model, that partially represent the process within the closed-loop system are determined, and values for the two parameters are calculated. Once the process model and the parameters are determined the adaptor 20 updates the control parameters to values that have been determined as appropriate for that process model. In a further embodiment of the invention, a three-parameter or a four-parameter process model is identified from the two observations of the response signal and from one or two predetermined process type parameters, such as the process type or the derivative factor.

The closed-loop root method tunes the controller to approximate a selected form of the characteristic equation for the closed-loop system. Therefore, tuning that produces similar closed-loop performance will occur as a result of any disturbance that causes an oscillating response. Once tuning is optimized, no oscillatory responses will be generated. The characteristic behavior of the closed-loop system is approximated by determining a complex root of the control system characteristic equation each time a sufficiently oscillatory response is detected. It should be apparent to those skilled in the art of adaptive control, that any closed-loop signal is sufficient to observe this complex root. It should further be apparent that this closed-loop root method is applicable to tune at least two control parameters of an adaptable controller, if process type information is known or has been predetermined.

The first step in this closed-loop root method, as generally indicated by step 164, is to re-examine the measured peak values in order to determine two features of the error response. In the preferred embodiment, one feature is selected to be the attenuation of the error response and the second feature is the period of the error response. Since the error response is a closed-loop variable, like the controlled measurement, or the controller output, it can be used to observe a complex root of the closed-loop characteristic equation. As described in greater detail hereinafter, the attenuation and the period of an oscillatory closed-loop signal contain sufficient information to approximate a complex root of the characteristic equation.

Figure 6A:
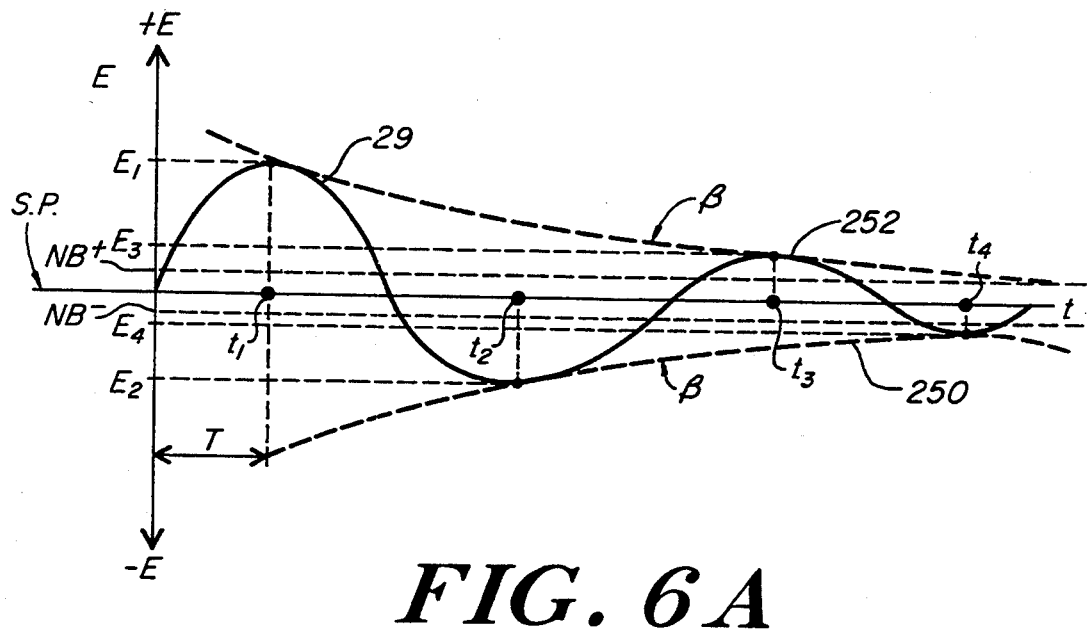
FIGS. 6a–6c illustrate response signals of the closed-loop system.

With reference to FIG. 6a, the attenuation and the period are illustrated for an error response that is characteristic of a second order system. In FIG. 6a, an oscillatory error response signal 29 is shown plotted against a set of axes, wherein the vertical axis represents the magnitude of the error response and the horizontal axis represents time. FIG. 6a further illustrates that the signal 29 can be characterized by as many as four amplitude values, $E_1$, $E_2$, $E_3$, and $E_4$, that represent the local maxima of signal 29 and that occur at times $t_1$, $t_2$, $t_3$, and $t_4$. As illustrated, the period T, is representative of the half-period, and the attenuation is represented by declining successive local maxima. The error signal 29 is assumed to be a damped sinusoid, represented as a function of time by the equation:

$$e = E_1 e^{-\alpha wt} \cos(wt + \phi) \quad (7)$$

for this representation, the attenuation, $\beta$ is:

$$\beta = e^{\alpha wt} \quad (8)$$

and the half period, T, is related to the radial frequency w, and given by:

$$T = \pi/w \quad (9)$$

Figure 6B:
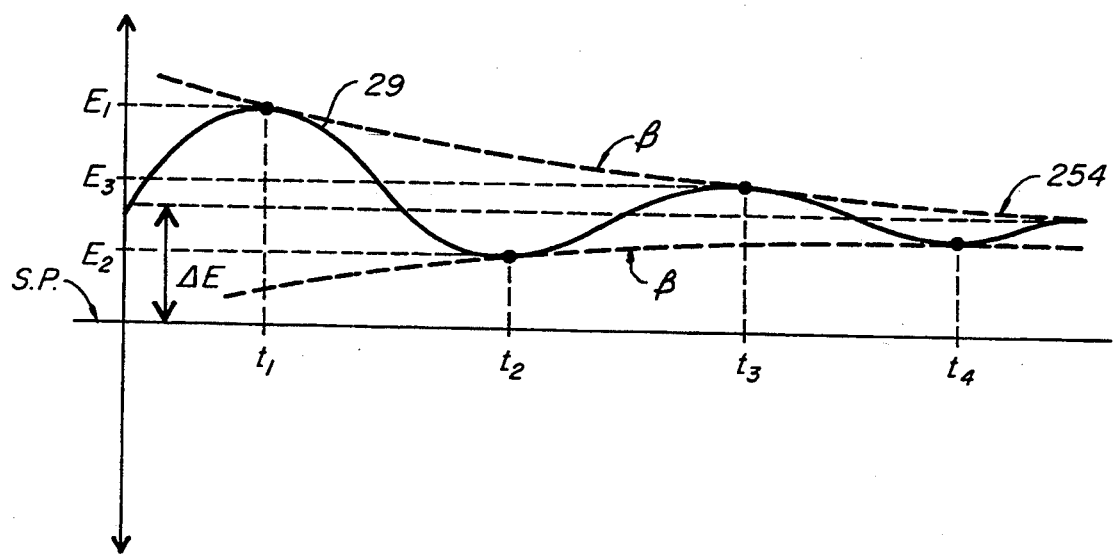
Figure 6C:
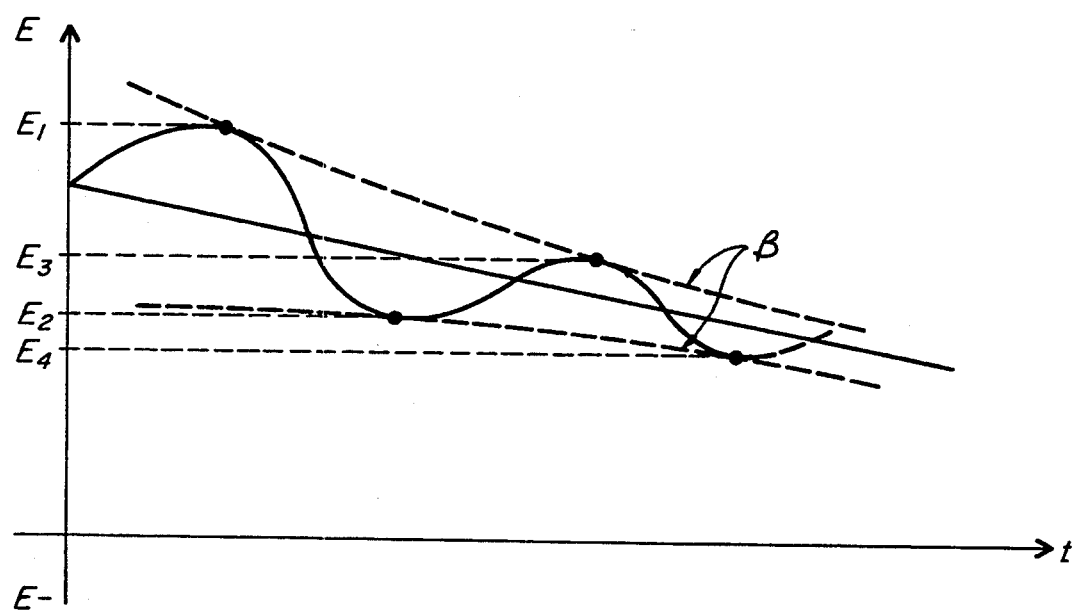
Figure 7:
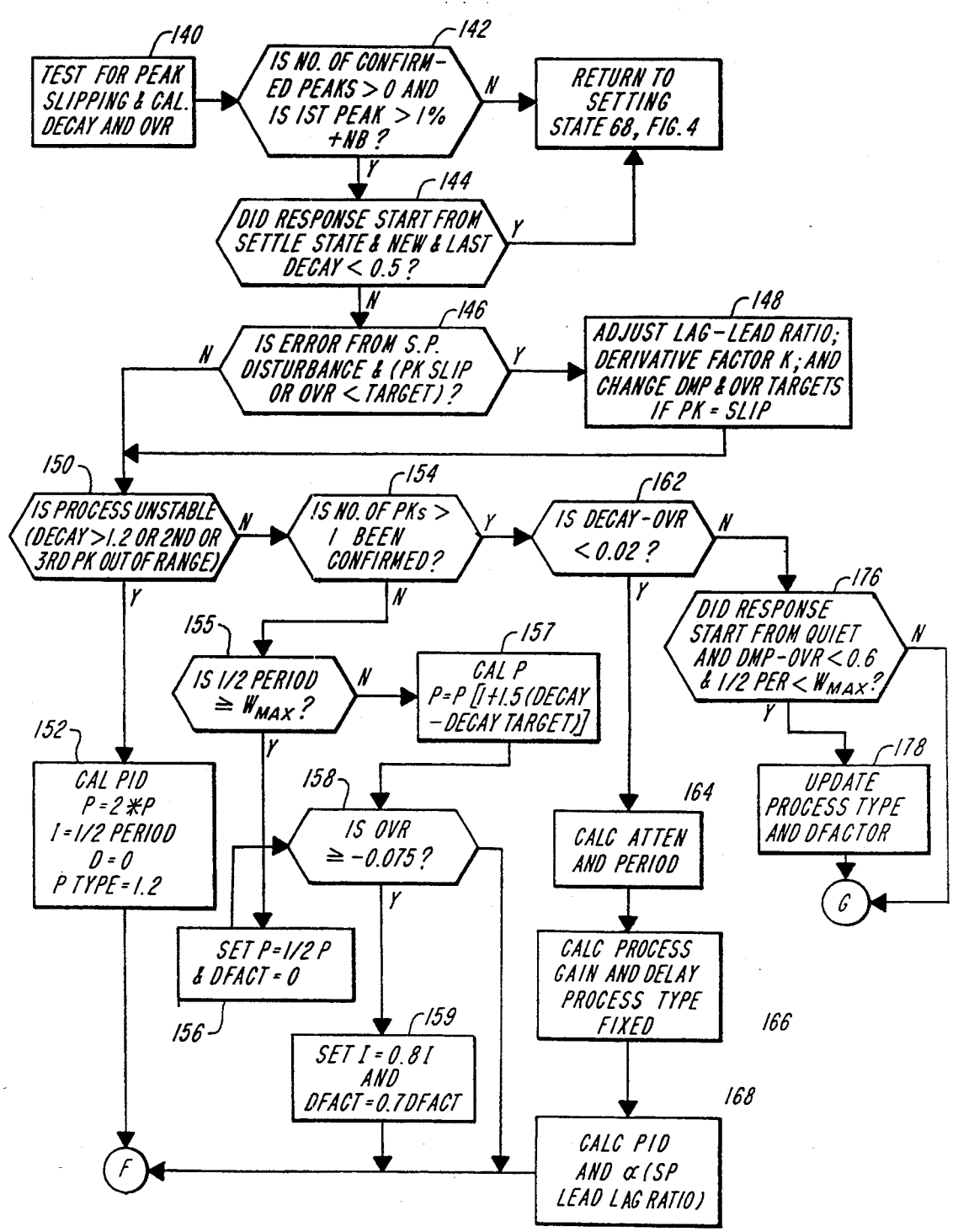
FIG. 7 is a flow diagram indicating the operation of the processor for determining corrective control parameters for the process.

In FIGS. 6a–6c, $\beta$ is determined from the upper and the lower envelopes, 250 and 252, as will be shown in equation 11.

As stated above, equation 7, representative of the error signal 29, is a closed-loop variable, and therefore, a closed-loop time domain response. It is assumed that this response characterizes the closed-loop system response and is not caused by a sinusoidal set point input or a sinusoidal load. This equation can therefore represent the autonomous time domain behavior of a root of the closed loop characteristic equation.

One term of the time domain response in equation 7 corresponds to an observable complex root of the closed-loop characteristic equation:

$$s = -\alpha w + jw \quad (10)$$

As can be seen from a comparison of equations 8, and equation 10, this observable root is defined by the half period T, and the attenuation, $\beta$, of the observed response signal. Therefore, by measuring the attenuation and the half period of the response signal, a complex root of the closed-loop system is substantially determined.

With reference again to FIG. 6a, it can be seen that the amplitude values of the local extrema and times at which the local extrema occur define the amplitude and the period of the response signal 29. In the preferred embodiment, the local peak amplitude and peak time are determined as discussed above in greater detail. Once the signal 29 crosses a threshold related to the noise band, the processor determines the system 10 is responding to a disturbance, and the processor enters the first of four states for locating local extrema, or amplitudes that will be used as estimates of local extrema.

With reference to FIG. 6a, the attenuation $\beta$ illustrated by the upper and lower envelopes 250 and 252 are determined from the determined amplitude values by the equation:

$$\beta = (-E_2 + 2E_3 - E_4)/(E_1 - 2E_2 + E_3) \quad (11)$$

$$T = \frac{(T_3 - T_1) - (T_4 - T_2)}{4} \quad (12)$$

With reference again to FIG. 6a, an alternative method for measuring the attenuation and the period will be described, that better illustrates an aspect of the invention that facilitates the tuning of the controller from non-isolated signals. The adaptor 20 uses the measured amplitude values of the observed signal 29 to calculate the attenuation and half-period. Attenuation $\beta$ and half-period T are calculated according to the equations:

$$\beta = -E_2/E_1 \quad (13)$$

$$T = T_2 - T_1 \quad (14)$$

As can be seen from FIG. 6a, the adaptor 20 measured four amplitude values, each representative of local signal peaks. As can be seen from equations 13 and 14, only two amplitude values were used to calculate the attenuation and the period of the signal 29. The number of amplitude values needed to calculate the attenuation and period depends on the shape of the signal 29. In FIG. 6a, the signal 29 is an isolated damped quadratic. There is no apparent term in the response signal that offsets the error signal from the set point, or that represents a low frequency sinusoid on which the signal 29 is superimposed.

In contrast, FIG. 6b illustrates a response signal 29 that is superimposed on a constant signal 250. This signal 29, that has the observable dominant root, is superimposed on this constant signal 254, that continues from the previous search interval, and therefore, signal 29 is non-isolated. As shown, the signal 29 is offset from the set point by the amount $\Delta E$. The adaptor 20 can compensate for the offset $\Delta E$ by computing the attenuation and the period according to the equations:

$$\beta = (-E_2 + E_3)/(E_1/E_2) \quad (15)$$

$$T = (T_3 - T_1)/2 \quad (16)$$

If the signal 29 is further superimposed on a linear signal, as illustrated in FIG. 6c, the adaptor 20 can compensate for both the observed offset and the slope by using four of the measured amplitude values. The attenuation and the period are calculated from the following equations:

$$\beta = (-E_2 + 2E_3 - E_4)/(E_1 - 2E_2 + E_3) \quad (17)$$

$$T = \frac{(T_3 - T_1) - (T_4 - T_2)}{4} \quad (18)$$

In the preferred embodiment, the four peak attenuation and period estimates of equations 17 and 18 are used as written. These equations include two samples of the upper decay envelope and two samples of the lower decay envelope. By including two samples of each envelope, equations 17 and 18 more reliably recognize an unstable (diverging, $\alpha > 0, \beta < 1$) response oscillation and calculate an average half-period value.

It can further be seen that the equations 17 and 18 can approximate a low frequency sinusoid, superimposed on the signal 29, as a linear signal over a three half period (T) span. It should be apparent to those skilled in the art, that other approximations can be made and other methods generally known in the art can be applied for estimating the attenuation of an oscillatory component of the response signal 29. For example, in order to fit the other component with a polynomial whose degree is higher than first, the attenuation of the higher frequency component would be estimated with ratio of peak amplitude differences involving more than four peaks. The number of peaks required is three more than the degree of the polynomial. The peak amplitude weighting factors follow the binomial-expansion pattern (1, −1; 1, −2, 1; 1, −3, 3, −1; 1, −4, 6, −4, 1; . . . ). Therefore if $\beta$ is determined from the first and second peaks as in equation 13, and a second $\beta$ is calculated from the second and the third peaks, by adding the numerators by adding the denominators, a new equation is obtained, equation 17, that computes a $\beta$ independent of the polynomials up to the number of peaks less three. This peak shifting method can be used to obtain equations that compensate for higher order polynomial terms. Specifically an n peak $\beta$ estimates, eliminates polynomial terms of degree up to the peak number minus three.

Once the approximated complex root is determined, the adaptor 20, in step 166, calculates the gain and the phase contributions of the process at this observed root. At this root, a pole of the combined controller and process, the absolute gain must be one, and the phase lag must be $(1+2n)\pi$ radians.

The process phase contribution is determined by the equation:

$$\Phi p = (1+2n)\pi - \Phi c; \qquad (19)$$

where $\Phi c$, represents the phase contribution of the controller, and is directly computable from the structure and the parameters of the controller, at the time the attenuation and the period were measured. N is assumed zero or known. The computation of the magnitude and the phase for a controller is generally known in the art and any method for computing these quantities services the present invention.

The process gain contribution is determined by the equation:

$$Gp = 1/Gc \qquad (20)$$

where the Gc represents the gain contribution of the controller, and is directly computed from the structure and the parameters of the controller, at the time the attenuation and the period were measured.

The process gain and phase are related to a process model that has multiple parameters. These multiple parameters are determined from the gain information and the phase information determined from the complex root.

In one embodiment of the invention, the process model is selected to be an integral-delay model This process model has the form:

$$\frac{1}{Is} e^{-\tau s}.$$

The two parameters of this model, the integral time I and the delay time $\tau$, are determined by the following equations:

$$\tau/T = \tfrac{1}{2} - (\Phi c + \tan^{-1}(\alpha))\pi \qquad (21)$$

$$I/T = Gc \exp(\pi\alpha\tau/T)/\pi(1+\alpha^2)^5 \qquad (22)$$

The adaptor 20 has now determined a two-parameter process model based on an observed complex root of the closed-loop system characteristic equation. In an alternative embodiment of the present invention, the adaptor selects among a plurality of parameter models. The selection is made according to a predetermined design criteria. In one example of this alternative embodiment, selection is made according to the sampling interval of the controller. Specifically, if the delay time calculated for the integral-delay model is less than one sampling interval, the gain-delay model is selected. For this model, the gain, k, and the delay time, $\tau$, are determined by the following equations.

$$\tau/T = 1 + 2n - \Phi c/\pi \qquad (23)$$

$$1/k = Gc \exp(\pi\alpha\tau/T) \qquad (24)$$

If the delay time $\tau$, calculated for the gain-delay model is less than one sampling interval, the integer n, which starts at zero, can be incremented. The integer n is incremented until $\tau$ is greater than one sampling interval. A further available model is the 3-parameter process model the gain-lag-delay model. For this mode, if the ratio of the lag to the delay is specified, the gain and the delay can be determined from the gain and the phase at the observed closed-loop root, and the lag can be determined from the specified ratio. The specified ratio can be a user-defined ratio or can be based on the process type parameter.

In one embodiment of the invention, a look-up table containing appropriate controller parameters for the identified process model is accessed to select controller parameters. The control parameter within the table can be experimentally or computationally determined.

It should be apparent to those skilled in the art that the closed-loop root method for partial process identification, provides an advantageous adaptive tuning system that can be applied as a primary self-tuning algorithm. Furthermore, when used with a pretune that identifies process type parameters, a model with more than two parameters can be used. The closed-loop root method has the advantage of allowing adaption on incomplete information necessary for the rapid convergence of the performance feedback technique. Furthermore, if the process has a significant secondary lag, the partial model method provides improved tuning over the performance feedback method. Additionally, the partial model method allows the tuning of non interacting and interacting PID controllers, as well as dead time controllers. It is also understood that the closed-loop root method achieves an optimal closed-loop time scale for the tuned control system.

It is further an advantage of the closed-loop root method that the tuning is updated aperiodically following a significant response to a disturbance. This is an advantage over a controller tuning system that updates controller parameters according to fixed-time step intervals. For periodic controllers, the update must recursively take into account a portion of the past system history. Over this time interval, both the process parameters and the statistical measures of the disturbance are usually assumed to be stationary. However, real processes may be subjected to minimal load changes for extended intervals and to large unmeasured and non-stationary load changes at other times. This makes choosing an adequate time interval difficult, particularly when effective adaption requires that a time-varying linear model represent a non-linear process. On the other hand, the adaptive scheme described above updates controller parameters in response to significant isolated error responses, and does not adapt the parameters during quiet states.

In another aspect of the present invention, a method for adapting a controller is provided through the steps of detecting a response to a disturbance applied to a control system, measuring the attenuation and the period of a closed-loop signal representative of the response approximating from the measured attenuation and period a complex root of the closed-loop system characteristic equation that partially identifies the process. In a further step, the invention selects a multi-parameter model and determines the values for the model parameters according to a function of the approximated root, the form of the model and the current controller structure and parameters. New controller parameters, more appropriate for the identified process model, are generated for the controller.

Appendix A describes process control technique in which the foregoing partial model identification can be practiced. While the invention has been particularly shown and described with reference to a preferred embodiment thereof, it will be understood by those skilled in the art that various changes in form and details may be made therein without departing from the spirit and scope of the invention, as defined by the appended claims. For example, a similar scheme can be applied to a non-interacting PID controller.

What is claimed is:

1. Process control apparatus for attaining a control system that has a selected closed-loop autonomous behavior, said control apparatus having
    signal monitoring means for monitoring a response signal being representative of the closed-loop autonomous behavior of the control system,
    controller means for generating a process control signal to affect a process so that a measured variable signal is directed toward a preselected value, said controller means including means for storing one or more control parameters, and means for generating said control signal as a function of said one or more control parameters and of said response signal, and
    adapter means for automatically adjusting at least one of said control parameters within said controller means, said control apparatus having the improvement in which said adapter means comprises
    measurement means for measuring at least two pattern features of said response signal, and for generating as a function of said pattern features a signal being representative of a complex root of the closed-loop autonomous behavior of the control system, and
    means for automatically modifying at least one of said control parameters as a function of said complex root signal, to adjust the closed-loop autonomous behavior of the control system.

2. Process control apparatus according to claim 1 wherein said measurement means further comprises
    selection means for selecting portions of said response signal, said selection means including
    means for measuring amplitude values of said response signal,
    means for storing one or more signal characteristics that are defined as functions of signal amplitude values and are determinative of one or more preselected signal patterns, and,
    means for determining said one or more signal characteristics of said response signal to select a series of amplitude values, wherein said series of amplitude values has said two pattern features and is representative of one of said preselected signal patterns.

3. Process control apparatus according to claim 2 wherein said selection means has means for storing signal characteristics representative of signal overshoot, of signal decay and of the half-period of a signal.

4. Process control apparatus according to claim 2, wherein said means for storing signal characteristics has means for storing signal characteristics representative of signal attenuation determinative of a damped signal.

5. Process control apparatus according to claim 2 wherein said means for determining signal characteristics includes means for selecting a series of amplitude values substantially representative of a damped sinusoid.

6. Process control apparatus according to claim 1 wherein said measurement means includes means for measuring amplitude values representative of the local extrema of said response signal, and means for measuring time intervals representative of the period of said response signal.

7. Apparatus according to claim 1 wherein said controller means further includes initiation means for selecting an initial set of said one or more control parameters for being modified by said adapter means, said initiation means having
    storage means for storing one or more sets of said control parameters, and
    selection means for selecting one of said stored sets of control parameters as a function of the magnitude of said response signal relative to a preselected threshold magnitude.

8. Apparatus according to claim 7 wherein said selection means further includes means for selecting said set of control parameters as a function of the magnitude of said response signal relative to the preselected threshold magnitude and as a function of a user-selected variable.

9. Process control apparatus for attaining a selected closed-loop autonomous behavior of a control system, said control apparatus having
    signal monitoring means for monitoring a response signal being representative of said closed-loop autonomous behavior of the control system,
    controller means for generating a process control signal to affect a process so that a measured variable signal is directed toward a preselected value, said controller means including means for storing one or more control parameters, and means for generating said control signal as a function of said one or more control parameters and of said response signal, and
    adapter means for automatically adjusting at least one of said control parameters within said controller means, said control apparatus having the improvement in which said adapter means comprises
    measurement means for measuring amplitude values of said response signal to characterize a first pattern feature representative of the attenuation of said response signal, and to characterize a second pattern feature representative of the time period of said response signal, said attenuation and said period of said response signal being substantially representative of a complex root of the closed-loop system, and,
    tuning means for automatically modifying at least one of said control parameters and including means for identifying a process model having one or more parameters that are a function of said attenuation and said time period, and further including means for selecting one or more controller parameters that have a known relation to said process model and said preselected closed-loop autonomous behavior of the control system.

10. Process control apparatus according to claim 9, wherein said measurement means has means for storing four successive amplitude values, and means for determining said attenuation and said period of said response signal as a function of said stored amplitude values.

11. Process control apparatus according to claim 9 wherein said measurement means has means for storing three successive amplitude values, and means for determining said attenuation and said period of said response signal as a function of said stored amplitude values.

12. Process control apparatus according to claim 9 wherein said measurement means has means for storing two successive amplitude values and has means for determining said attenuation and said period of said response signal as a function of said amplitude values.

13. Process control apparatus according to claim 9 wherein said tuning means further comprises means for identifying a process model including
- means for storing at least two model processes wherein each of said model processes has two or more variable parameters,
- means for selecting, according to a predetermined criterion, one of said stored model processes for determining, according to a function of said measured attenuation and said period, said model parameters, and,
- means for selecting as a function of said model parameters and of said preselected criteria, a process model representative of the process connected within the control system.

14. Process control apparatus according to claim 13, wherein said measurement means further comprises means for sampling said response signal at a known interval and for generating a digital representation of said response signal.

15. Process control apparatus according to claim 14, wherein said tuning means further comprises means for selecting said process model being representative of said process connected within the control system as a function of said model parameters, said measured period and said digital sampling interval.

16. Process control apparatus according to claim 9 wherein said means for identifying a process model includes means for selecting between a gain-delay model or an integral-delay model.

17. Process control apparatus according to claim 9 wherein said tuning means further includes means for storing a table of predetermined controller parameters indexed relative to said selected process model.

18. Process control apparatus according to claim 9, wherein said tuning means has means for storing a process type variable and means for determining said one or more model parameters as a function of said process type variable, of said attenuation and of said period.

19. Control apparatus for generating a process model of a process connected within a closed-loop control system, said control apparatus comprising
- controller means for generating a process control signal to affect the operation of the process, said controller means including
  - storage means for storing one or more control parameters,
  - signal means for generating said process control signal as a function of said one or more control parameters, and
  - signal monitoring means, coupled to the process, for measuring amplitude values and time values of a response signal representative of the closed-loop autonomous behavior of the control system and representative of an oscillatory signal behavior,
- root identification means for computing as a function of said amplitude and time values a signal substantially representative of the attenuation of said response signal and a signal substantially representative of the period of said response signal, and for generating as a function of said attenuation and said period, a signal substantially representative of a complex root of said closed-loop system, and
- process identification means, for generating as a function of said complex root signal and said control parameters, a model of said process.

20. Apparatus according to claim 19 wherein said process identification means includes means for generating, as a function of said complex root signal and said control parameters, a gain signal substantially representative of a gain of said controller means, and a phase signal substantially representative of a phase angle of said controller means.

21. Apparatus according to claim 19 wherein said process identification means includes means for generating, as a function of said complex root signal and said control parameters, a gain signal substantially representative of a gain of the process, and a phase signal substantially representative of a phase angle of the process.

22. Apparatus according to claim 21 wherein said process identification means includes means for storing a process model having one or more variable parameters, and means for selecting values for said one or more variable parameters as a function of said phase signal and said gain signal.

* * * * *